(12) United States Patent
Yeung

(10) Patent No.: US 6,463,218 B1
(45) Date of Patent: Oct. 8, 2002

(54) FOLDABLE MASK FOR CAMERA VIEWFINDER AND METHOD OF USING SAME TO ALTER FIELD FRAME

(75) Inventor: Chi Ping Yeung, Sai Yung Pun (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/541,958

(22) Filed: Apr. 4, 2000

(51) Int. Cl.[7] .......................... G03B 13/10; G03B 17/24
(52) U.S. Cl. ...................... 396/378; 396/6; 396/311; 396/316
(58) Field of Search ................ 396/6, 60, 311, 396/315, 316, 378, 380

(56) References Cited

U.S. PATENT DOCUMENTS

| | | | |
|---|---|---|---|
| 2,542,939 A | 2/1951 | Cisski ........................... 33/64 |
| 4,283,860 A | 8/1981 | Rucker ......................... 33/277 |
| 4,931,818 A | 6/1990 | Gates .......................... 354/222 |
| 4,933,694 A | 6/1990 | Gates et al. ................. 354/222 |
| 5,257,055 A | 10/1993 | Cho et al. .................... 354/222 |
| 5,353,076 A | 10/1994 | Goddard ....................... 354/94 |
| 5,386,259 A | 1/1995 | Ichikawa et al. ............. 354/94 |
| 5,410,381 A | 4/1995 | Kameyama et al. ........ 354/222 |
| 5,430,517 A | 7/1995 | Zander ........................ 354/222 |
| 5,500,704 A | 3/1996 | Kawano ...................... 354/222 |
| 5,506,647 A | 4/1996 | Sakamoto et al. .......... 354/159 |
| 5,530,510 A | 6/1996 | Alligood ...................... 354/222 |
| 5,555,058 A | 9/1996 | Huang et al. ............... 354/222 |
| 5,587,755 A | 12/1996 | Wilson et al. .............. 396/380 |
| 5,623,324 A | 4/1997 | Dassero et al. ............. 396/380 |
| 5,659,832 A | 8/1997 | Nishizawa et al. ......... 396/435 |
| 5,689,743 A | 11/1997 | Horning et al. ............ 396/316 |
| 5,778,269 A | * 7/1998 | Williams .................... 396/387 |
| 5,828,914 A | 10/1998 | Balling ....................... 396/378 |
| 5,895,134 A | 4/1999 | Freeman et al. ........... 396/319 |
| 5,933,667 A | * 8/1999 | Freund ....................... 396/379 |
| 5,999,756 A | * 12/1999 | Nishimura et al. ........ 396/296 |
| 6,151,452 A | * 11/2000 | Ping .......................... 396/315 |
| 6,181,881 B1 | * 1/2001 | Konishi et al. ............ 396/378 |

* cited by examiner

*Primary Examiner*—Alan A. Mathews
(74) *Attorney, Agent, or Firm*—Woodcock Washburn LLP

(57) ABSTRACT

An apparatus for alternating between two field frames in a camera viewfinder. The mask has a foldable mask with an aperture, with the mask being movable between two positions. In the first position, the mask is unfolded and interposed in the light-path of the viewfinder, thereby framing the viewfinder image in the shape of the aperture. In the second position, the mask is folded and stored compactly alongside the viewfinder, thereby not interfering with the image in the viewfinder.

36 Claims, 3 Drawing Sheets

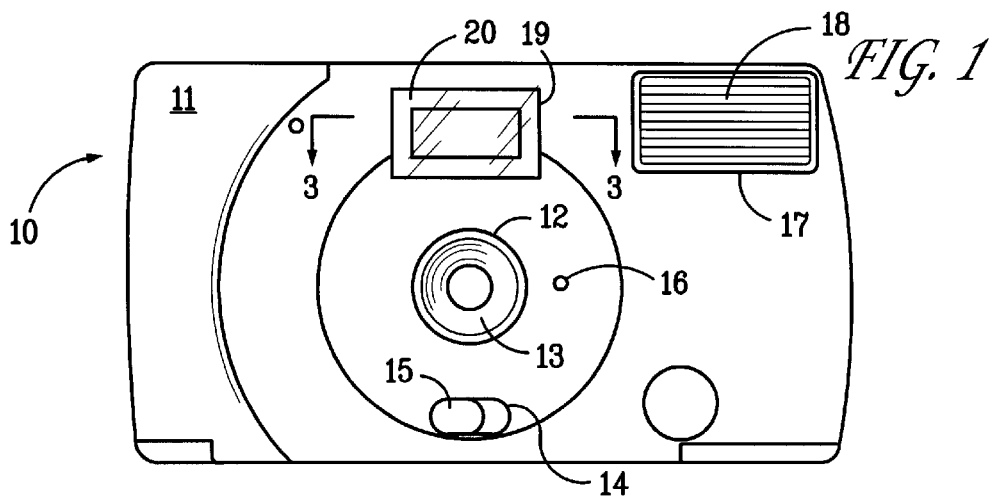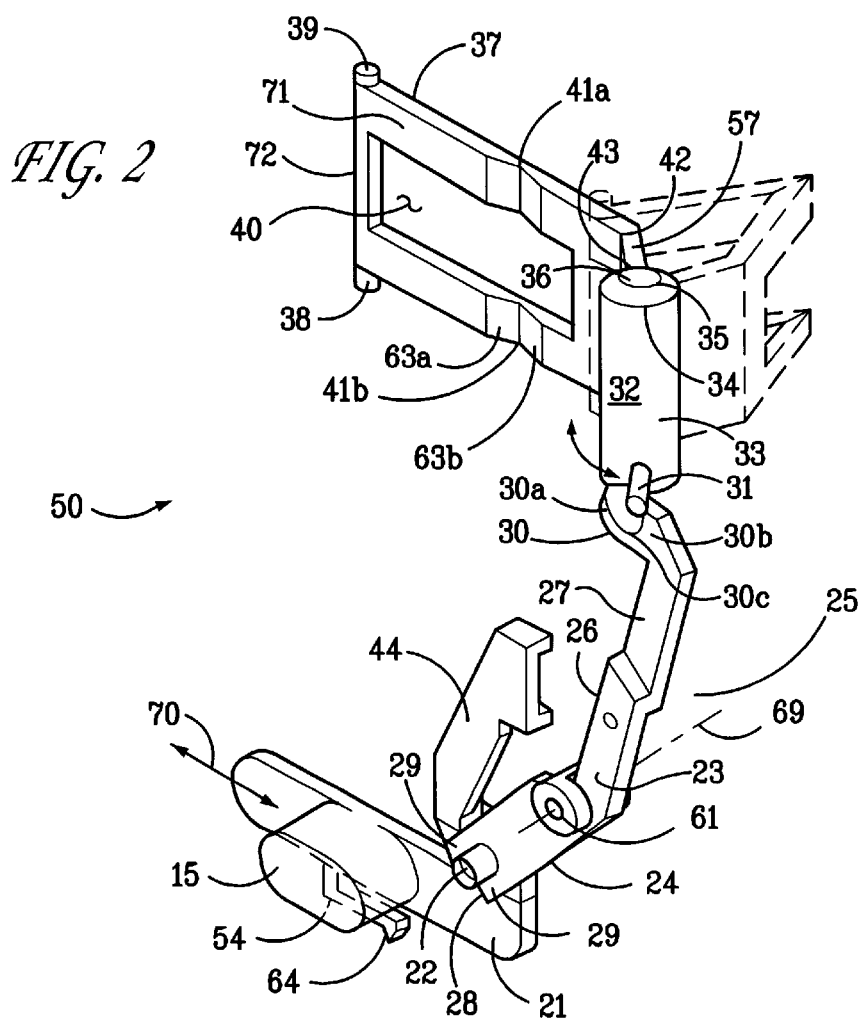

FOLDABLE MASK FOR CAMERA VIEWFINDER AND METHOD OF USING SAME TO ALTER FIELD FRAME

FIELD OF THE INVENTION

The present invention relates generally to the field of photography, and, more particularly, to an apparatus for altering the field frame of an image in the viewfinder of a camera, and to a method of using the apparatus.

BACKGROUND OF THE INVENTION

A typical camera includes a viewfinder through which a photographer can view an image to be photographed. The photographer's view through the viewfinder is essentially a preview of the image that will be captured by the camera. Ideally, the field frame of the viewfinder image should accurately represent the format of the image to be captured. In other words, given that a photographic image has finite boundaries (e.g., a rectangle of a particular height and width), the photographer should be able to discern by looking through the viewfinder which objects will fall within those boundaries and which objects will fall without.

Various cameras support more than one format. For example, Advanced Photo System ("APS") cameras permit a photographer to select a format from among rectangular shapes having various aspect ratios. Some 35 mm cameras have a normal mode and a "panorama" mode, thus offering a photographer a selection of two aspect ratios. Certain "special use" or "novelty" cameras allow an image to be framed in a shape such as a circle or a heart at the election of the photographer. A viewfinder, however, is generally a fixed optical system, so the image in the viewfinder has boundaries determined by the fixed dimensions of the system. In a multi-format camera, it is desirable to provide a mechanism to alter the field frame in the viewfinder to correspond to a selected format.

One device for altering the field frame in a viewfinder is a mask having an aperture with a shape corresponding to a selected format. The mask is placed in the viewfinder's optical path when the format corresponding to its aperture's shape is selected, and is removed from the optical path when that format is not selected. The use of a mask in a viewfinder is generally known. See, e.g., U.S. Pat. Nos. 2,542,939; 5,430,517; 5,530,510; 5,555,058; 5,587,755; 5,689,743; 5,623,324; and 5,828,914. Using a mask in some cameras, however, has drawbacks: first, the mask requires an apparatus to move the mask into and out of the viewfinder's optical path, and, second, the mask must be stored when it is not in use. Both the mask-moving apparatus and the storage of the mask require space, which requires that the camera be made large enough to provide the space. Moreover, the apparatus may increase the cost and complexity of the camera. Increased cost and size are particularly undesirable in certain types of cameras, such as single-use cameras, whose principal advantage is that they are small and inexpensive.

In view of the foregoing, there is a need for a device that overcomes the drawbacks of the prior art.

SUMMARY OF THE INVENTION

The present invention is directed to a foldable mask, and a mechanism for moving the foldable mask into and out the optical path of a device, such as a camera viewfinder.

A mask having a hinge is provided. The mask is foldable by way of the hinge, which is preferably a living hinge formed in the material of which the mask is made. The mask is located in the vicinity of the optical path in which it is to be placed, which, in a preferred embodiment, is the optical path in a camera viewfinder. The mask is movable between two positions, a first (unfolded) position where it is in said optical path, and a second (folded) position where it is not in said optical path. A power transmission mechanism moves the mask from the first position to the second position. As the mask moves, the locus of motion of the mask is restricted to rotational motion on one side of the mask and linear motion on the other side. This combination of motion restrictions causes the mask to fold at the hinge as it moves from the first position to the second position. The folded mask stores compactly alongside the viewfinder while it is not in use.

In a preferred embodiment of the invention, the mask is made of a light-intercepting material having an aperture. The shape of the aperture corresponds to the shape of a field frame to be used for an image. For example, in many cameras a "panorama" picture format is characterized by a rectangular shape that is about twice as wide as it is high. In such a case, a mask having an elongated rectangular aperture can be placed in between the lenses of a two-lens viewfinder perpendicular to the optical path, thereby allowing a photographer to see the viewfinder image in a panorama format.

In another preferred embodiment, the mask is used in the viewfinder of a multi-format camera having a format-selector switch. In such an embodiment, a user can operate the power transmission mechanism, by way of the format-selector switch, to move the mask between its two positions. For example, the camera may support two formats, one corresponding to the natural shape of the viewfinder, and the other corresponding to the aperture of the mask. A photographer uses the format selector switch to move the mask into, or out of, the viewfinder's optical path, depending upon which format the photographer wishes to use. The multi-format camera is preferably an APS camera in which the switch is also coupled to a format-encoding device. The format-encoding device encodes a film to indicate which format has been selected for an exposed frame. Preferably, the switch operates both the mask and the format-encoding device, so that the format to be encoded will be set at the same time that the photographer selects the viewfinder field frame.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 1 is a front plan view of a camera embodying aspects of the invention;

FIG. 2 is a view of a mask and a mask-folding assembly used in the camera of FIG. 1;

DETAILED DESCRIPTION OF THE INVENTION

Figure 3:
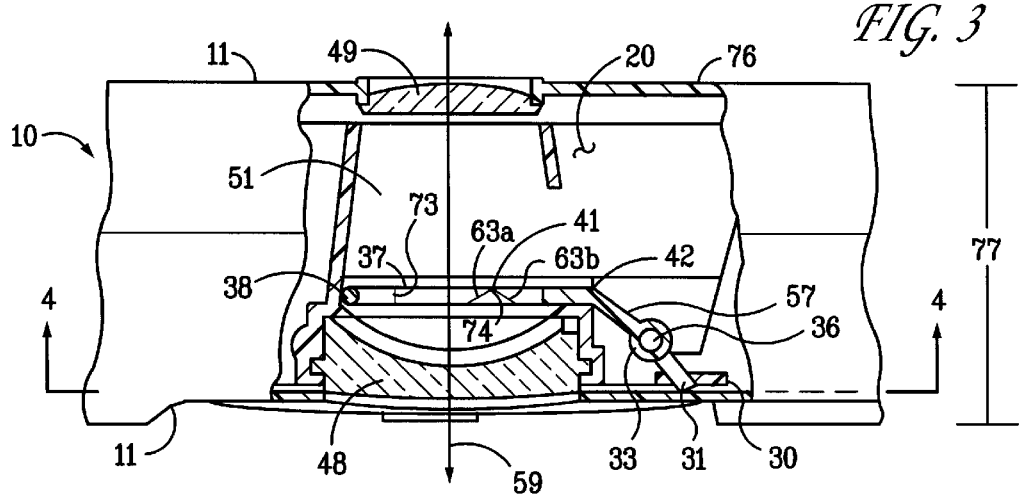
FIG. 3 is a cross-sectional top view of the camera of FIG. 1 taken along line 3—3, showing the mask in its unfolded position.

Various cameras permit a photographer to select from among several picture formats. APS cameras generally support two or three rectangular formats of different aspect ratios, and some 35 mm cameras allow a photographer to select from among various shapes in which an image can be framed. Such a camera generally has a viewfinder, in which an image is viewed as being framed by the fixed dimensions of the viewfinder. The present invention provides a device for alternating between different field frames in a viewfinder, thus allowing a single viewfinder to be used for more than one picture format. The device provided may also be used in other optical devices in which it is useful to alternate between different field frames.

Referring to the drawings, wherein like numerals are used to indicate like elements throughout, there is shown in FIG. 1 a camera 10 in accordance with the invention. Camera 10 may be any type of camera, such as a 35 mm camera, Advanced Photo System (APS) camera, one-time-use camera, digital still camera, digital video camera, lens-fitted film package (LFFP), or any other device in which it is useful to select from among two or more different field frames. Camera 10 may be a camera in which the different field frames are rectangles having different aspect ratios. Alternatively, the selection of field frames may include non-rectangular shapes, such as a circle or a heart. Preferably, camera 10 supports two different field frames, such as two rectangular field frames having different aspect ratios. Camera 10 may, for example, be an APS camera supporting two of the three formats that the APS standard provides (e.g., the APS formats include "C" (conventional), "H" (high-vision), and "P" (panorama), and camera 10 supports the "H" and "P" formats). Preferably, camera 10 is a one-time-use two-format APS camera. It will be appreciated that camera 10 can support different formats without necessarily being able to lay down differently shaped images on a medium such as a photographic film. Rather camera 10 may provide any type of support for multiple formats. For example, in the case of an APS camera, all images are laid down on film with the same aspect ratio, but a format-encoding mechanism is used to magnetically or optically encode on the film the photographer's selection of format.

Camera 10 has an outer shell 11, which blocks light from entering the area in which film is located. Outer shell 11 is preferably formed of an opaque thermoplastic material, but may be formed of a metal or any light-blocking material. Alternatively, outer shell 11 may comprise a variety of different materials joined together in any manner, so long as outer shell 11 retains sufficient light-blocking properties to prevent extraneous light from interfering with exposure of an image. Outer shell 11 preferably has various openings, such as a lens-assembly opening 12 which receives lens assembly 13, a switch-handle opening 14 which receives switch handle 15, a flash-assembly opening 17 which receives flash-assembly 18, a viewfinder opening 19 which receives viewfinder 20, and a format-encoding opening 16. Viewfinder 20 and format encoding opening 16 are further discussed below.

Referring to FIG. 2, there is shown a mask-folding assembly 50 in accordance with aspect of the invention. Mask-folding assembly 50 is preferably incorporated in camera 10. Mask-folding assembly 50 includes a rigid horizontal slider 21. A protrusion 15 is formed in horizontal slider 21, and protrusion 15 functions as a switch handle, as shown in FIG. 1. Encoding-light-blocking arm 44 and pin-mounting extension 68 (shown in FIG. 6) extend from horizontal slider 21. Encoding-light-blocking arm 44 and pin-mounting extension 68 is preferably formed with horizontal slider 21 as a single piece, or, alternatively, may be formed as separate pieces and fixedly connected to horizontal slider 21. Protruding from pin-mounting extension 68 in the same direction as protrusion 15, is slider pin 22, which is either formed in pin-mounting extension 68 or fixedly attached thereto.

A lever 23 rotates about lever axis 69. Lever 23 has a lower arm portion 24 on one side of axis 69, and an upper arm portion 25 on another side of axis 69. The lower arm portion 24 of lever 23 has a forked end 28 defined by a pair of tines 29. Forked end 28 rotatably receives slider pin 22 between tines 29, so as to permit forked end 28 to rotate about slider pin 22. In this way, horizontal slider 21 can be used to apply a torque to lever 23. Specifically, when a force is applied to horizontal slider 21 along axis 70 in either direction, slider pin 22 moves rectilinearly in the same direction as horizontal slider 21, thereby causing slider pin 22 to apply force to the forked end 28 of lever 23, which, in turn, provides torque to lever 23, causing it to rotate about axis 69.

Figure 4:
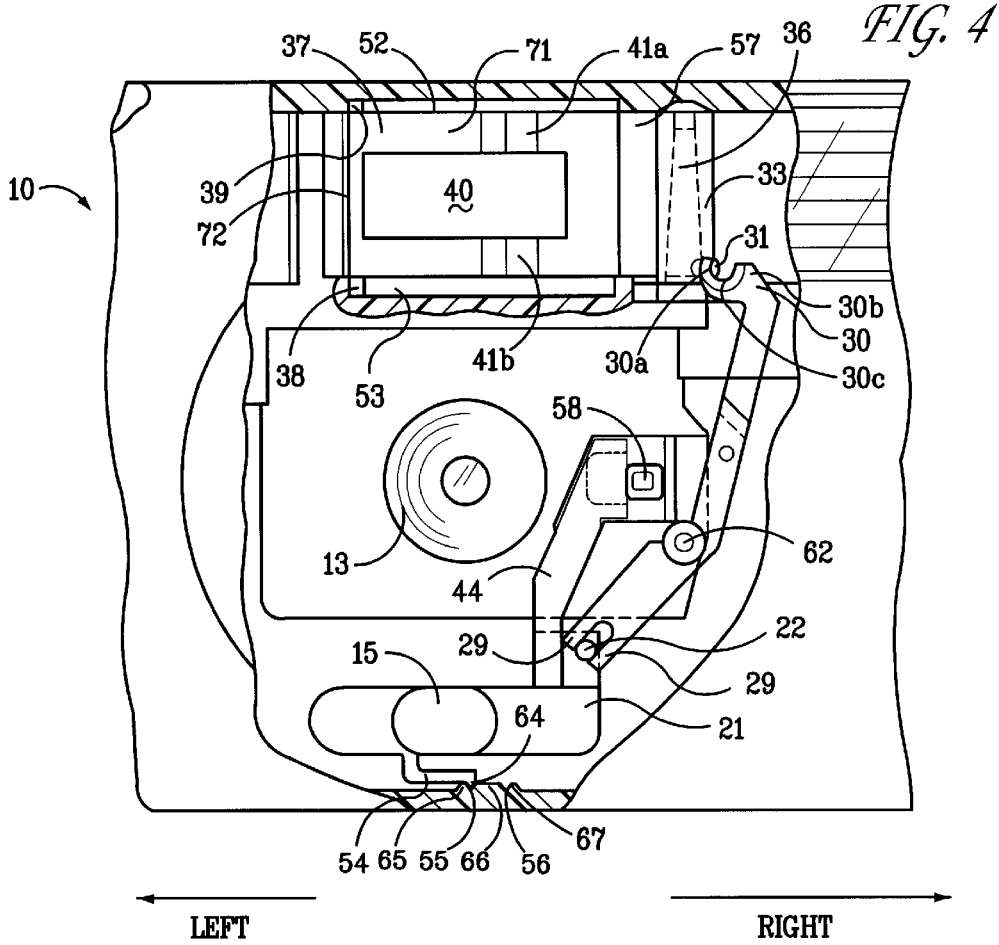
FIG. 4 is a cross-sectional front view of the camera of FIG. 1 taken along line 4—4, showing the mask and mask-folding assembly, the mask being in its unfolded position.
Figure 6:
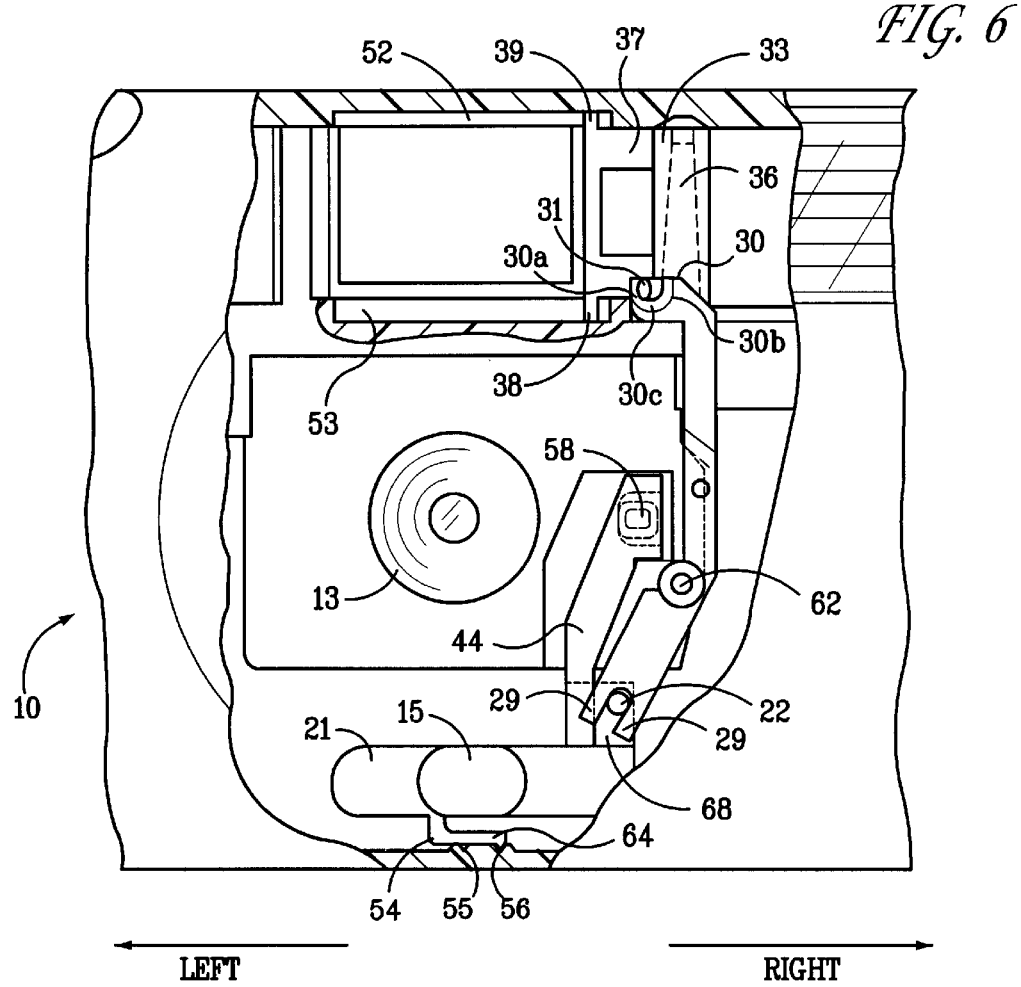
FIG. 6 is a cross-sectional front view of the camera of FIG. 1, taken along the same line as in FIG. 4, showing the mask and mask-folding assembly, the mask being in its folded position.

Lever 23 is rotatably mounted about axis 69 by means of a hole 61, and lever-mounting pin 62 (see FIGS. 4 and 6). Hole 61 is formed in lever 23 at an intermediate point along lever 23. Lever-mounting pin 62 extends along axis 69 so as to permit lever-mounting pin 62 to be received in hole 61. Lever-mounting pin 62 may be formed in a structure of camera 10, or it may be otherwise fixed in position such that it lies in axis 69 to provide sufficient support for lever 23 to rotate about axis 69.

Upper arm portion 25 is shown as comprising two separate portions, central arm portion 26 and outer arm portion 27, which lie in different planes. Such an arrangement is necessary or useful if upper arm portion 25 is to be sculpted to fit around a structure (not shown) of camera 10, wherein said structure has surfaces lying in different planes. Alternatively, all of upper arm portion 25 may be configured in another arrangement, such as one plane, several planes, or a curved surface. Lever 23 may be sculpted to accommodate whatever physical environment in which mask-folding assembly 50 is incorporated, without departing from the spirit and scope of the invention.

Upper arm portion 25 has a U-shaped end 30, which movably receives pivot-assembly pin 31. U-shaped end 30 is defined by arm-extensions 30a and 30b, and by the curved portion 30c by which they are joined. U-shaped end 30 permits lever 23 to apply force to pivot-assembly pin 31. As lever 23 rotates about axis 69, arm-extension 30a or 30b (depending upon the direction in which lever 23 is rotating) pushes against pivot-assembly pin 31, thereby applying a force to pivot-assembly pin 31. Pivot-assembly pin 31 moves along the inner surface of U-shaped end 30 as lever 23 proceeds through its locus of movement.

Pivot-assembly pin 31 extends outwardly from pivot assembly 32. Pivot assembly 32 comprises a solid annular member 33 and a spindle 36. The annulus that defines solid annular member 33 is the area between outer circle 34 and inner circle 35. Solid annular member 33 is the downward projection of the annulus between circles 34 and 35. As shown in FIGS. 4 and 6, solid annular member 33 preferably has a sloped inner surface, but it is also possible to construct solid annular member 33 with a non-sloped inner surface. The shape and size of spindle 36 is complementary to that of the inner surface of solid annular member 33, so as to allow solid annular member 33 to fit snugly, but rotatably over spindle 36. If solid annular member 33 has a sloped inner surface as shown in FIGS. 4 and 6, then the outer surface of spindle 36 has a complementary slope. However, both solid annular member 33 and spindle 36 may have non-sloped surfaces, so long as solid annular member 33 fits over and around spindle 36. The length of spindle 36 defines an axis about which solid annular member 33 rotates. Pivot-assembly pin 31 is either formed in, or fixedly mounted to, solid annular member 33. By applying a force to pivot-assembly pin 31, a torque is applied to solid annular member 33, thus causing solid annular member 33 to rotate about spindle 36.

Referring now to mask 37, mask 37 comprises a light-blocking portion 71 and an aperture 40. Aperture 40 has a shape, which, in the drawings, is shown as a rectangle. The shape of aperture 40 corresponds to the shape of a field frame that is to be imposed on an image. Light-blocking portion 71 comprises a material that blocks, partially-blocks, or distorts light in whose path it is interposed, such as an opaque or translucent plastic or resin. However, light-blocking portion need not be opaque. For example, it may be tinted so that images passing through light-blocking portion 71 appear dimmer or in a different color that unobstructed images, or it may be frosted so that images passing through light-blocking portion 71 appear blurred. The key is that when an object is viewed by the human eye through the mask, the image seen through aperture 40 should be clearly framed by light-blocking portion 71 in the shape defined by aperture 40. This result is accomplished by any material that visibly distinguishes what is inside the aperture from what is outside the aperture.

It will be observed that the shape of aperture 40 is shown as having a rectangular shape with a particular aspect ratio. However, the rectangular shape shown is not limiting of the invention. The particular shape of aperture 40 depends on the application for which the mask is to be used. The rectangular shape shown can be used, for example, to impose a "panorama" field frame upon the viewfinder image in an APS camera that supports the panorama format. However, it will be appreciated by those skilled in the art that there are various other applications in which a non-rectangular shape could be used. For example, a 35 mm camera might have a circular or heart-shaped template that can be placed over the film at the time the film is exposed to frame the exposure with such a shape. In such a case, it is desirable to permit a photographer to see, through the viewfinder, what the image will look like with a circular or heart shape frame. In such a case, aperture 40 of mask 37 could have a circular or heart-shaped frame. Aperture 40 may have any shape appropriate for the application in which the invention is deployed, without departing from the spirit and scope of the invention.

Additionally, it should be appreciated that the mask of the present invention is not limited to one having an aperture. For example, a mask having only a light-blocking portion and no aperture could be used to completely obscure an image. Alternatively, a mask may be made of a tinted material and used for tinting, rather than framing, an image. As another alternative, a mask may be made of a transparent material, where the image is framed by marks etched in the material rather than by an aperture. Virtually any type of mask that in some way interferes with the passage of light may be used without departing from the spirit and scope of the invention.

Mask 37 is fixedly attached to solid annular member 33 at junction 43. Junction 43 may be formed by any of a variety of means, such as heat bonding, chemical bonding, glue, or a clamp. Alternatively, solid annular member 33 and mask 37 can be formed as a single piece, in which case the attachment between solid annular member 33 and mask 37 is inherent, and no additional attachment means need be employed to form junction 43.

Mask 37 extends outward from solid annular member 33. Along the length of mask 37 there is a bend 42. As mask 37 extends from solid annular member 33, it extends in a first plane, and then it bends at bend 42. From bend 42, mask 37 proceeds to extend in a second plane. Mask 37 has an end side 72. Along end side 72, lower mask pin 38 extends downward from mask 37, and upper mask pin 39 extends upward from mask 37. Mask pins 38 and 39 may be formed in mask 37, or they may be formed separately and fixedly connected to mask 37. Lower mask pin 38 is receivable in lower track 53 (see FIGS. 4–6), and upper mask pin 38 is receivable in upper track 52 (see FIGS. 4 and 6). Mask pins 38 and 39, and tracks 52 and 53, are further discussed below.

Mask 37 is foldable at an intermediate point along its length by way of a hinge 41. Hinge 41 comprises upper hinge part 41a, and lower hinge part 41b, which are located along the upper and lower portions, respectively, of aperture 40. In an embodiment in which mask 37 has no aperture 40, hinge 41 would extend continuously across the surface of the mask, rather than being broken into parts 41a and 41b. In a preferred embodiment of the invention, hinge 41 comprises a "living hinge," as depicted in the drawings. A living hinge is formed by sculpting a material in such a way that its thickness at a point is reduced, which makes an otherwise rigid material foldable at that point. Hinge 41 shown in the drawings is a living hinge formed by reducing the thickness of light-blocking portion 71 of mask 37 from a first thickness 73 (shown in FIG. 3), to a second thickness 74 (also shown in FIG. 3). Between first thickness 73 and second thickness 74 are two transitional sections 63a and 63b, where the surface of light-blocking portion 71 of mask 37 is sloped. When a living hinge is employed, light-blocking portion 71 comprises a material that can be made flexible by reducing its thickness. In a preferred embodiment, the light-blocking portion 71 of mask 37 is made of polypropylene, first thickness 73 is preferably in the range 0.7 to 1.0 mm, more preferably equal to 0.8 mm, and second thickness 74 is preferably in the range 0.1 to 0.2 mm, more preferably equal to 0.15 mm. Where a living hinge is not employed, hinge 41 may comprise a swivel hinge or other hinging means. In an embodiment where a living hinge is not employed, light-blocking portion 71 of mask 37 are formed of separate portions, which are joined together at hinge 41. Hinge 41 may comprise any hinging means, without departing from the spirit and scope of the invention.

Figure 5:
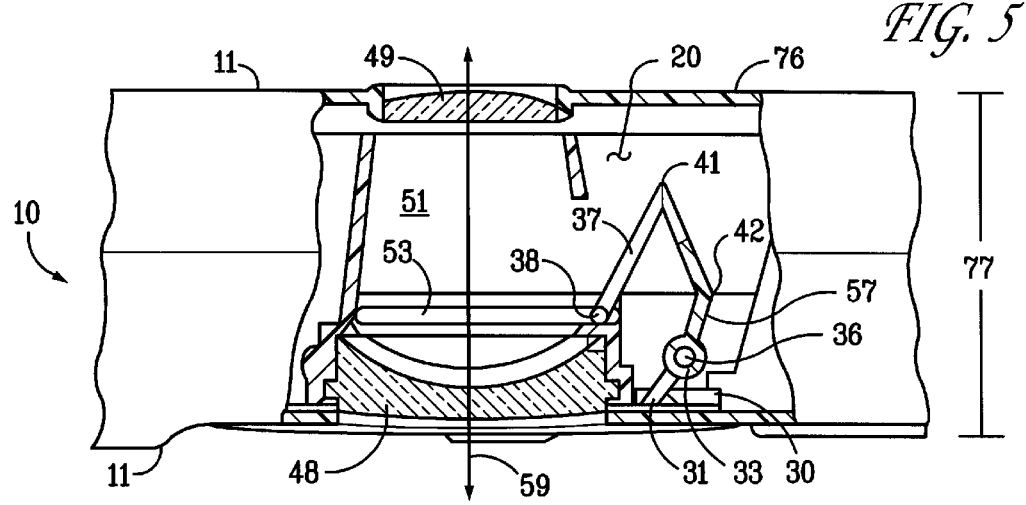
FIG. 5 is a cross-sectional top view of the camera of FIG. 1, taken along the same line as in FIG. 3, showing the mask in its folded position.

Referring now to FIGS. 3 and 5, it will be observed that mask 37 can be located in the vicinity of a viewfinder 20 of camera 10. Viewfinder 20 may be an inverted Galilean finder, as shown in FIGS. 3 and 5, which comprises a front lens 48 and an eye lens 49. Between front lens 48 and eye lens 49 is an open space 51. Light travels through viewfinder 20 along optical axis 59. When the viewfinder image is to be viewed as framed by the light blocking portion 71 of mask 37, mask 37 can be placed in open space 51 to intercept those portions of the image that are outside of aperture 40. On the other hand, when the viewfinder image is to be viewed in the natural shape of viewfinder 20, mask 37 can be removed from open space 51. FIGS. 3 and 4 show mask 37 in a first position, wherein mask 37 is inserted into open space 51 between front lens 48 and eye lens 49 and lies in a plane perpendicular to optical axis 59. In the position shown in FIGS. 3 and 4, mask 37 intercepts the outer portions of the viewfinder image and allows the inner portion to pass through aperture 40. FIGS. 5 and 6 show mask 37 in a second position, wherein it lies off to the side of open space 51. In the second position, mask 37 does not intercept portions of the viewfinder image. In the second position, mask 37 is folded at hinge 41, thereby allowing it to be stored compactly. It will be noted that, if mask 37 were unable to assume the folded position shown in FIG. 5, then it would extend beyond rear wall 76 of camera 10 when retracted from the optical path of viewfinder 20, unless camera 10 were designed with sufficient fore-to-aft thickness 77 to accommodate the unfolded mask. Thus, the folding of mask 37 permits the camera 10 to be made thinner than it would need to be if it had to accommodate the storage of mask 37 in a fully extended, unfolded position.

A mechanism in accordance with the invention will now be described by means of which mask 37 is folded as it moves from a first position to a second position. As shown in FIGS. 4 and 6, lower mask pin 38 is slidably received in lower track 53, and upper mask pin 39 is slidably received in upper track 52. Lower track 53 can also be observed in FIG. 5, where it can be seen that lower track 53 extends along the width of front lens 48 a distance approximately equal to the width of the front lens 48. Lower track 53 has a groove of sufficient size to snugly, but slidably, accommodate lower mask pin 38. Additionally, as can be seen in FIGS. 4 and 6, the depth of lower track 53 is sufficient to receive the length of lower mask pin 38. When lower mask pin 38 is received in lower track 53, lower track 53 thus confines the locus of motion of lower mask pin 38 to a straight line along front lens 48. Upper track 52 has a corresponding structure that similarly confines the locus of motion of upper mask pin 39 to a straight line along front lens 48. Upper track 52 is positioned above lower track 53 in direct rectilinear opposition to lower track 53, and the two track lie in parallel planes. Thus, when both upper mask pin 39 and lower mask pin 38 are received in their respective tracks 52 and 53, the locus of motion of the end side 72 of mask 37 is confined to a plane along front lens 48.

As discussed above, mask 37 is fixedly attached at junction 43 to solid annular member 33, which rotates about spindle 36. As solid annular member 33 rotates, it attempts to swing the entirety of mask 37 in an arc. However, tracks 52 and 53 confine the motion of mask end 72 to a plane along front lens 48. Therefore, when torque is applied to solid annular member 33 (in a clockwise direction from the perspective shown in FIGS. 3 and 5) and mask 37 swings in a clockwise direction along with it, mask 37 must bend at hinge 41 to accommodate the swinging motion on one side and the rectilinear motion on the other side. As will be recalled, mask 37 is made of sufficiently rigid material such that it does not bend under this mechanical action, except as permitted by hinge 41. In this way, mask 37 folds as it moves from the position shown in FIG. 3 to the position shown in FIG. 5. It will be appreciated by those skilled in the art that the folding is brought about by the inconsistency between the motion restrictions imposed on either side of mask 37, and, while the restrictions depicted in the drawings are linear and circular motion, other restrictions could serve equally well. For example, tracks 52 and 53 could follow curved paths, or pivot assembly 32 could comprise a camming mechanism that rotates mask 37 in an elliptical path, without departing from the spirit and scope of the invention.

In a typical embodiment of the invention wherein mask 37 is incorporated in a camera such as camera 10, the torque required to rotate solid annular member 33 will be applied by way of the lever 23 and slider 21 discussed above. The process by which the mask is alternated between a first (unfolded) position and second (folded) position will now be described with reference to such an embodiment. More particularly, in the embodiment described below, camera 10 is an APS camera, and mask 37 is used to alternate the field frame of viewfinder 20 between the panorama ("P") format and the high-vision ("H") format. In this exemplary embodiment, the natural, unobstructed shape of viewfinder 20 corresponds to the "H" format, and the shape of aperture 40 corresponds to the "P" format.

Referring to FIGS. 3 and 4, wherein mask 37 is in a first position, it can be seen that horizontal slider 21 and its protruding switch handle 15 are in a leftward position along the surface of camera 10. A jagged surface is formed by a first 65, second 66, and third 67 raised portions. The aforesaid raised portions are preferably formed in the outer shell 11 of camera 10, but may be formed in another structure, so long as the structure does not move relative to mask-folding assembly 50. The area between the three raised portions define a first notch 55 and a second notch 56. L-shaped extension 54 extends from horizontal slider 21. Barb 64 at the end of L-shaped extension 54 is receivable in either first notch 55 or second notch 56. L-shaped extension 54 is resilient so as to bias barb 64 downward into either first notch 55 or second notch 56, thereby allowing slider 21 to be anchored in either first notch 55 or second notch 56. However, the bias of L-shaped extension 54 is sufficiently low that it allows barb 64 to be dislodged from either notch so as to permit horizontal movement of horizontal slider 21. In the position shown in FIG. 4, barb 64 is lodged in first notch 55, thus anchoring horizontal slider 21 in a leftward position, which is the position horizontal slider 21 rests in when mask 37 is in its unfolded position.

In order to move the mask from the unfolded, light-intercepting position to the folded, non-light-intercepting position, a user of the camera applies rectilinear force to switch handle 15, moving it in a rightward direction. Upon initial application of the force, barb 64 is dislodged from first notch 55, eventually coming to rest in second notch 56 when mask 37 is in the folded position. As horizontal slider 21 moves to the right, slider pin 22 moves along with it in the same direction. As slider pin 22 moves rectilinearly, it imparts a force to one of tines 29, which, in turn, imparts a torque to lever 23. The torque causes lever 23 to rotate counterclockwise about lever pin 62. As lever 23 rotates, arm extension 30b of U-shaped end 30 imparts a force to pivot-assembly pin 31, causing it to move in a leftward direction. As pivot-assembly pin 31 moves leftward, it applies a torque to solid annular member 33, which rotates about spindle 36 (in a clockwise direction, as viewed in FIG. 3). The torque on solid annular member 33 causes mask 37 to rotate about spindle 36 which, for the reasons described above, causes mask 37 to fold. As mask 37 folds, it assumes the position shown in FIGS. 5 and 6. It will be observed that, when mask 37 is in the folded position, barb 64 is anchored in second notch 56. As can be seen in FIG. 6, when mask 37 is in the unfolded position, the optical path through viewfinder 20 is unobstructed, thus allowing a photographer to see an image framed by the natural aperture of viewfinder 20.

The process to restore mask 37 to the folded position is similar to the process described above. A user of camera 10 applies a rectilinear leftward force to switch handle 15, thus dislodging barb 64 from second notch 56 and moving horizontal slider 21 to the left, which causes slider pin 22 to move to the left as well. Slider pin 22 imparts a force to one of tines 29, which imparts a torque to lever 23, causing it to rotate clockwise. Arm extension 30a of U-shaped portion 30 moves to the right as lever 23 rotates clockwise, thus causing it to impart a force to pivot-assembly pin 31, which applies a torque to solid annular member 33 and rotates it about spindle 36 (counterclockwise, as viewed in FIG. 5). The torque on solid annular member 33 is applied to mask 37, causing it to rotate counterclockwise. As mask 37 rotates, mask end 72 moves along tracks 52 and 53, thus causing the mask to flatten as it rotates, ultimately assuming the position shown in FIGS. 3 and 4. As can be seen in FIG. 4, when mask 37 is in its unfolded position, it reduces the aperture through viewfinder 20, thus allowing a photographer to view an image through viewfinder 20 as being framed according to the aperture 40 of mask 37.

It will also be observed that, as horizontal slider 21 moves in response to the force applied, encoding-light-blocking arm 44 moves rectilinearly along with it. Encoding-light-blocking arm 44 is formed of an opaque material, which prevents light from passing through it. Encoding-light-blocking arm 44 can alternately cover or uncover format-encoding aperture 58. Format-encoding aperture, which is lined up with format-encoding opening 16 on the outer shell 11 of camera 10, allows light from outside of camera 10 to pass through to film (not shown) in camera 10 at the time the film is exposed to the image to be captured. The purpose of allowing this light through is to expose a dot on APS film, where the dot is a code representing that the format selected for a frame is the "P" ("panorama") format. The absence of a dot on the film indicates that the exposure selected for a frame is the "H" ("high vision") format. Thus, when horizontal slider 21 is in the leftward position (where mask 37 is unfolded), encoding-light-blocking arm 44 does not block format-encoding aperture 58 (as shown in FIG. 4), thus allowing light to pass unobstructed through format-encoding opening 16 and format-encoding aperture 58. This light exposes a dot in an appropriate place on APS film. On the other hand, when horizontal slider 21 is in the rightward position, encoding-light-blocking arm 44 blocks light from entering format-encoding aperture 58 (as shown in FIG. 6), thereby preventing a dot from being exposed on the film. By way of this mechanism, the format selected by the photographer, which the photographer can see through viewfinder 20, is memorialized on APS film.

Thus, an apparatus for altering the field frame in a viewfinder has been disclosed. While the invention has been described with reference to preferred embodiments, it is understood that the words which have been used herein are words of description and illustration, rather than words of limitation. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A camera comprising:
   a viewfinder;
   a mask comprising a rigid or semi-rigid light-intercepting material; and
   a hinge located along said mask; wherein said mask is movable between a first mask position and a second mask position, wherein said mask in said first mask position is located so as to interfere with an image in said viewfinder, wherein said hinge lies across a portion of said mask that interferes with said image when said mask is in said first mask position, and wherein said mask in said second mask position is folded at said hinge and is located so as not to interfere with said image.

2. The camera of claim 1, wherein said hinge is a living hinge.

3. The camera of claim 1, wherein said viewfinder comprises a front lens and an eye lens, and wherein the location of said mask in said first mask position is between said front lens and said eye lens.

4. The camera of claim 1, wherein said mask further comprises an aperture whereby light can travel through said aperture, said aperture having a first shape.

5. The camera of claim 4, wherein said first shape is a rectangular shape.

6. The camera of claim 4, wherein said camera is an APS-format camera supporting a first APS format and a second APS format, wherein said first shape corresponds to said first APS format, and wherein said image in said viewfinder has a second shape when no interception of said image is performed, said second shape corresponding to said second APS format.

7. The camera of claim 1, further comprising a power transmission mechanism operatively connected to said mask, said mask movable between said first mask position and said second mask position by way of said power transmission mechanism.

8. The camera of claim 7, wherein said power transmission mechanism comprises a user-operated switch and a lever.

9. The camera of claim 7, wherein said camera is an APS-format camera comprising a format-encoding light opening and a light-blocking member, said member preventing light from passing through said format-encoding light opening when said member is in a first member position, said member not preventing light from passing through said format-encoding opening when said member is in a second member position, said light-blocking member being operatively connected to said power transmission mechanism and movable between said first member position and said second member position by way of said power transmission mechanism, wherein said light-blocking member is in one of its two positions when said mask is in said first mask position, and wherein said light-blocking member is in the other of its two positions when said mask is in said second mask position.

10. A camera supporting at least two formats, said camera comprising:
    a viewfinder having a first lens and a second lens;
    a mask comprising a light-intercepting material having an aperture through which light can travel, said aperture having a first shape corresponding to a first of said formats;
    a hinge located between a first and second end of said mask, said mask being foldable by way of said hinge;
    a rotatable member non-movably attached to said first end of said mask, said rotatable member restricting motion of said first end to a curved motion;
    a first pin depending from said second end of said mask;
    a first track which slidably receives said first pin, said first track restricting motion of said second end to motion along said first track;
    a user-operatable format-selector switch movable between two positions; and a power transmission mechanism, operatively connected to said rotatable member and to said format-selector switch, whereby operation of said format-selector switch causes said rotatable member to rotate;

wherein said mask is movable between a first position and a second position, said mask in said first position being unfolded and being located between said first and second lenses in the path of light passing between said lenses, said mask in said second position being folded at said hinge and not being located between said first and second lenses so as not to interfere with light passing between said lenses.

11. The camera of claim 10, wherein said first shape is a rectangular shape.

12. The camera of claim 10, wherein said hinge is a living hinge.

13. The camera of claim 10, wherein said rotatable member rotates in a circular motion about a spindle.

14. The camera of claim 10, wherein said camera is an APS camera supporting two APS formats, wherein said first shape corresponds to a first of said APS formats, and wherein said viewfinder has a second shape, said second shape corresponding to a second of said formats.

15. The camera of claim 10, wherein said power-transmission mechanism comprises a lever.

16. The camera of claim 10, wherein said first track is linear.

17. The camera of claim 10, further comprising:
a second pin extending from said second end of said mask in a direction opposite to the direction in which said first pin depends from said mask; and
a second track which slidably receives said second pin, said second track being positioned rectilinearly opposite said first track and in a plane parallel to said first track.

18. An apparatus for interposing an aperture in a light path, said apparatus comprising:
a mask comprising a rigid or semi-rigid material with said aperture formed therein;
hinging means integrated in said mask across said aperture, whereby said mask is foldable at the location of said hinging means; and
folding/unfolding means for transforming said mask between a folded position and an unfolded position, wherein said aperture is interposed in said light path when said mask is in said unfolded position, and wherein said aperture is not interposed in said light path when said mask is in said folded position.

19. The apparatus of claim 18, wherein said hinging means comprise a living hinge.

20. The apparatus of claim 18, wherein said shape is a rectangular shape.

21. The apparatus of claim 18, wherein said apparatus is incorporated in a camera having one or more light paths, and wherein said light path is one of the light paths in said camera.

22. The apparatus of claim 21, wherein said light path is the viewfinder light path in said camera.

23. The apparatus of claim 22, wherein said camera is an APS camera, and wherein the shape of said aperture corresponds to one of the "C," "H," or "P" APS formats.

24. The apparatus of claim 18, further comprising:
power-transmission means operatively connected to said folding/unfolding means;
aperture-selection means operatively coupled to said power-transmission means, wherein operation of said aperture-selection means causes said folding/unfolding means, by way of said power-transmission means, either to fold or to unfold said mask.

25. A method of using a mask to alternate between two apertures in a camera having a viewfinder, said viewfinder having a first aperture, said mask being formed of a light-intercepting material and having a second aperture, said mask further having a hinge whereby said mask is foldable, said method comprising the acts of:
positioning a mask into a first position wherein said mask is in the path of light passing through said viewfinder; and
folding said mask across said second aperture, whereby said mask moves into a second position at least partially out of the path of light passing through said viewfinder.

26. The method of claim 25, wherein said hinge is a living hinge.

27. The method of claim 25, wherein the shape of said aperture is a rectangular shape.

28. The method of claim 25, wherein said camera is an APS camera, and wherein said first and second apertures correspond to two different APS formats.

29. The method of claim 25, wherein said folding act is actuated by the operation of a format selector switch.

30. An apparatus for interfering with a light path comprising:
a mask having a light-interfering property, said mask having a first end and a second end;
a hinge located along said mask between said first and second ends;
a first pin depending from said second end of said mask;
a first track perpendicular to said light path, said first track slidably receiving said first pin, whereby motion of said second end of said mask is restricted to movement along said first track; and
a rotating member being fixedly attached to said mask and said second end;
whereby said mask is movable between a first position and a second position, said mask in said first position being unfolded and interfering with said light path by lying perpendicular to said light path along said first track, said mask in said second position being folded at said hinge and not interfering with said light path.

31. The apparatus of claim 30, wherein said apparatus is incorporated in a camera having a viewfinder, wherein said light path is the light path in said viewfinder.

32. The apparatus of claim 30, wherein said mask comprises:
a light-blocking material; and
an aperture having a shape.

33. The apparatus of claim 32, wherein said shape is a rectangular shape.

34. The apparatus of claim 30, wherein said hinge is a living hinge.

35. The apparatus of claim 30, further comprising:
a second pin extending from said second end of said mask in a direction opposite to the direction in which said first pin depends from said second end of said mask; and
a second track, which slidably receives said second pin, said second track being positioned rectilinearly opposite said first track and in a plane parallel to said first track.

36. The apparatus of claim 30, further comprising:
a lever, operatively coupled to said rotating member; and
a user-operatable switch, operatively coupled to said lever; whereby operation of said user-operatable switch causes, by way of said lever, said rotating member to rotate.

* * * * *